US011959788B2

United States Patent
Buchner et al.

(10) Patent No.: US 11,959,788 B2
(45) Date of Patent: Apr. 16, 2024

(54) WIDE RANGE FLOW MEASURING DEVICE HAVING TWO CORIOLIS METERS ARRANGED IN SERIES AND A BYPASS LINE TO BYPASS THE SECOND CORIOLIS METER

(71) Applicant: AVL LIST GMBH, Graz (AT)

(72) Inventors: Michael Buchner, Graz (AT); Thomas Rothlaender, Graz (AT); Andre Steinhoefler, Grosswilfersdorf (AT); Patrick Tinauer, Graz (AT); David Bischof, Graz (AT); Jaime Diaz Fernandez, Graz (AT)

(73) Assignee: AVL LIST GMBH, Graz (AT)

( * ) Notice: Subject to any disclaimer, the term of this patent is extended or adjusted under 35 U.S.C. 154(b) by 341 days.

(21) Appl. No.: 17/312,003

(22) PCT Filed: Dec. 12, 2019

(86) PCT No.: PCT/AT2019/060435
§ 371 (c)(1),
(2) Date: Jun. 9, 2021

(87) PCT Pub. No.: WO2020/118341
PCT Pub. Date: Jun. 18, 2020

(65) Prior Publication Data
US 2022/0065677 A1    Mar. 3, 2022

(30) Foreign Application Priority Data
Dec. 12, 2018    (AT) ............... A 51099/2018

(51) Int. Cl.
*G01F 1/88*    (2006.01)
*G01F 1/50*    (2006.01)
*G01F 15/02*    (2006.01)

(52) U.S. Cl.
CPC ............... *G01F 1/88* (2013.01); *G01F 1/50* (2013.01); *G01F 15/02* (2013.01)

(58) Field of Classification Search
None
See application file for complete search history.

(56) References Cited

U.S. PATENT DOCUMENTS 5,469,747 A * 11/1995 Carlisle ............... G01F 1/84
                                                 73/861.355
2007/0006640 A1   1/2007 Gysling
(Continued)

FOREIGN PATENT DOCUMENTS

AT      519880 A4    11/2018
CN   101354273 A     1/2009
(Continued)

*Primary Examiner* — Kristina M Deherrera
*Assistant Examiner* — Mark A Shabman
(74) *Attorney, Agent, or Firm* — Norman B. Thot (57) ABSTRACT

A measuring system for measuring a mass flow rate, a density, a temperature or a flow velocity. The measuring system includes a main line, a first Coriolis measuring device arranged in the main line, a second Coriolis measuring device arranged in series with the first Coriolis measuring device in the main line, a bypass line which bypasses the second Coriolis measuring device, a first valve arranged in the bypass line, and a computing unit which is connected to the first Coriolis measuring device and to the second Coriolis measuring device. The first valve opens depending on a pressure. The first Coriolis measuring device is designed for a higher maximum flow rate than the second Coriolis measuring device.

15 Claims, 3 Drawing Sheets

(56) References Cited

U.S. PATENT DOCUMENTS

| | | |
|---|---|---|
| 2009/0309051 A1 | 12/2009 | Kresse et al. |
| 2011/0125424 A1 | 5/2011 | Han et al. |
| 2013/0291971 A1 | 11/2013 | Hains et al. |
| 2014/0174158 A1 | 6/2014 | Quatmann et al. |
| 2015/0204250 A1 | 7/2015 | Le Forestier |
| 2017/0199529 A1 | 7/2017 | Ding |
| 2018/0275697 A1 | 9/2018 | Lichtenegger et al. |
| 2020/0217284 A1 | 7/2020 | Volk et al. |

FOREIGN PATENT DOCUMENTS

| | | |
|---|---|---|
| CN | 101603555 A | 12/2009 |
| CN | 103782148 A | 5/2014 |
| CN | 205066832 U | 3/2016 |
| CN | 206095334 U | 4/2017 |
| EP | 2 660 570 A2 | 11/2013 |
| GB | 384383 A | 12/1932 |
| JP | S50-143569 A | 11/1975 |
| JP | S58-27020 A | 2/1983 |
| JP | H02-504671 A | 12/1990 |
| JP | H04-99469 U | 8/1992 |
| JP | H08-240469 A | 9/1996 |
| JP | 2001-82989 A | 3/2001 |
| JP | 2007-57270 A | 3/2007 |
| JP | 2010-174736 A | 8/2010 |
| JP | 2015-529781 A | 10/2015 |
| JP | 2018-520436 A | 7/2018 |
| WO | WO 2016/206983 A2 | 12/2016 |

\* cited by examiner

WIDE RANGE FLOW MEASURING DEVICE HAVING TWO CORIOLIS METERS ARRANGED IN SERIES AND A BYPASS LINE TO BYPASS THE SECOND CORIOLIS METER

CROSS REFERENCE TO PRIOR APPLICATIONS

This application is a U.S. National Phase application under 35 U.S.C. § 371 of International Application No. PCT/AT2019/060435, filed on Dec. 12, 2019 and which claims benefit to Austrian Patent Application No. A51099/2018, filed on Dec. 12, 2018. The International Application was published in German on Jun. 18, 2020 as WO 2020/118341 A1 under PCT Article 21(2).

FIELD

The present invention relates to a measuring system for measuring a mass flow rate, a density, a temperature or a flow velocity, having a main line, a first Coriolis measuring device arranged in the main line, a second Coriolis measuring device arranged in series with the first Coriolis measuring device in the main line, a bypass line via which the second Coriolis measuring device can be bypassed, a valve arranged in the bypass line, and a computing unit which is connected to the first Coriolis measuring device and to the second Coriolis measuring device. The present invention also relates to a method for measuring a mass flow rate, a density, a temperature or a flow velocity using a measuring system of this kind.

BACKGROUND

Measuring systems of this kind and related measuring methods are used in a plurality of installations in which information on flow rates, densities or velocities prevailing in the installation are required. The applied measuring devices can measure the flow rates of liquids and of gases in the corresponding lines. An example for a flow rate measurement is the application of such an arrangement for consumption measurement of fuels in motor vehicles that can be either gaseous or liquid.

In known consumption measuring systems, Coriolis measuring devices are usually used which comprise a high accuracy for single-phase flows and which are also suitable for measuring flow velocities and flow rates of gaseous media. Coriolis measuring devices are measuring devices that need to build up a pressure in order to indicate correct measurement results. These measuring devices also always achieve sufficiently accurate measurement results only in one, and one specific, flow range. For this reason, measuring devices have become known in which several Coriolis measuring devices of different sizes are combined.

An example thereof is the system described in EP 2 660 570 A2 for supplying a gas turbine with gaseous fuel. For consumption measurement, it is there proposed to connect two flow meters in parallel and to connect a third flow meter in series. All three flow meters can be bypassed via a bypass line in which a switching valve is arranged. For this purpose, two smaller flow measuring devices are connected in parallel upstream of a larger flow measuring device, with the maximum flow rate of the smaller devices corresponding to the maximum flow rate of the larger device. All three flow meters are always flowed through expect when one of the flow meters is removed for calibration. The result of the sum of the two small flow meters is compared to the measurement result of the large flow meter. The result is that, if the deviation is too large, either the measured values are weighted, or only one of the measured values is used.

When using such flow meters of different sizes that can be connected in series or in parallel, the problem occurs, however, that it is not possible to provide a sufficient accuracy for different required pressures over a large flow measuring range. In known embodiments, pressure surges also occur when switching the switching valves; this influences the entire system and not only lead to measurement errors, but may also damage the connected device to be measured.

SUMMARY

An aspect of the present invention is to provide a measuring system and a measuring method for measuring a mass flow rate, a density, a temperature or a flow velocity, with which the existing flow rates can be determined very accurately over a wide measuring range in the case of different output pressure requirements by the customer, wherein transient responses of the system should be avoided in order to prevent pressure surges and the associated consumption peaks and damages to the connected specimen, and to thus be able to carry out an accurate and continuous, dynamic measurement with both gaseous and liquid media.

In an embodiment, the present invention provides a measuring system for measuring a mass flow rate, a density, a temperature or a flow velocity. The measuring system includes a main line, a first Coriolis measuring device arranged in the main line, a second Coriolis measuring device arranged in series with the first Coriolis measuring device in the main line, a bypass line which is configured to bypass the second Coriolis measuring device, a first valve arranged in the bypass line, and a computing unit which is connected to the first Coriolis measuring device and to the second Coriolis measuring device. The first valve is configured to open depending on a pressure. The first Coriolis measuring device is designed for a higher maximum flow rate than the second Coriolis measuring device.

BRIEF DESCRIPTION OF THE DRAWINGS

The present invention is described in greater detail below on the basis of embodiments and of the drawings in which.

DETAILED DESCRIPTION

Because the first Coriolis measuring device is designed for a higher maximum flow rate than the second Coriolis measuring device and the valve is a valve opening depending on pressure, it is possible to use the respective measured values of the measuring device measuring in the corresponding measuring range with a higher accuracy. A valve opening depending on pressure is a valve which, upon reaching a swelling pressure, starts to release an opening cross-section, wherein the opening cross-section increases with increasing pressure. Compared to a switching valve, pressure surges that lead to a discontinuity of the measured flow rate can thereby be avoided. These pressure surges would occur if the full flow cross-section of the bypass line was suddenly released, causing a sudden release and consequently a sudden drop in pressure at the Coriolis measuring device with the smaller maximum flow rate. This would have knock-on effects on the entire system so that no correct measured value could be read out.

A correct measurement is achieved by a method for measuring a mass flow rate, a density, a temperature or a flow velocity with such a measuring system, in which in a first measuring range, in which the valve opening depending on pressure in the bypass line is closed, the measured values of the Coriolis measuring device with lower maximum flow rate are used as output values of the mass flow rate, the density, the temperature or the flow velocity, in a second measuring range, in which the valve opening depending on pressure is further closed and the flow rate and the pressure are greater than the flow rate and the pressure in the first measuring range, the measured values of the Coriolis measuring device with higher maximum flow rate and the measured values of the Coriolis measuring device with lower maximum flow rate are measured and weighted as a function of the differential pressure of the second Coriolis measuring device and the output values for the mass flow rate, the density, the temperature or the flow velocity are calculated in the computing unit from the weighted measured values of the first Coriolis measuring device and the second Coriolis measuring device, and in a third measuring range, in which the valve opening depending on pressure is open and the pressure in the bypass line is higher than the pressure in the second measuring range, the measured values of the Coriolis measuring device with the higher maximum flow rate are used as output values for the mass flow rate, the density, the temperature or the flow velocity. In the Coriolis measuring devices, in order to obtain correct measured values with regard to consumption on the specimen, it is necessary to have a sufficient flow velocity across the measuring device and to avoid sudden pressure fluctuations. The large Coriolis measuring device is always flowed through but provides measured values with lower accuracy at low flow velocities. The measured values of the small Coriolis measuring device are only used when the valve opening depending on pressure is closed. This second Coriolis measuring device then provides highly accurate measured values for small flow rates. The measured values of the first Coriolis measuring device with the higher maximum flow rate now always correspond to the actual values to be measured of the specimen in the third measuring range, since pressure surges are avoided and a falsification of the measured values in comparison with the actual values on the specimen, which could be caused by a pressure fluctuation occurring on the smaller Coriolis measuring device, is prevented. A pressure fluctuation that would cause a flow fluctuation, which in turn would be measured by the Coriolis measuring device with the higher maximum flow rate and thus falsify the desired values of the specimen, is prevented because the Coriolis measuring device with the lower maximum rate is flowed through with an almost constant flow after switching the valve opening depending on pressure, so that the differential pressure across the second Coriolis measuring device remains unchanged and pressure fluctuations are avoided. Both Coriolis measuring devices provide good measured values in the interpolation range, which can then be interpolated on a weighted basis so that a steady output signal can be generated over the entire course.

In an embodiment of the method according to the present invention, the measured values of the Coriolis measuring device with the higher maximum flow rate are used in a fourth measuring range located between the second and the third measuring range and the valve opening depending on pressure is still closed. By introducing the fourth measuring range, a security distance is established to the range in which measured values of the smaller Coriolis measuring device are still taken into account, so that in case of minor shifts of the opening pressure, no measured value errors can occur due to a medium flowing past the smaller Coriolis measuring device.

In the measuring system according to the present invention, the valve opening depending on pressure can, for example, be a check valve. This has the advantage that the valve gradually releases or closes the flow cross-section at a defined pressure depending on the pressure in the bypass channel without external control, thereby reliably avoiding pressure surges that would exert a retroactive effect on the measuring system. An external power supply is not required. Check valves are furthermore compact and largely maintenance-free.

In an embodiment of the present invention, the check valve can, for example, comprise a spherical or conical closure body. Closure bodies have the advantage that, with a smaller nominal size, they are not prone to vortex formation, which could cause pulsations to occur in the pressure and flow rate, which would have a negative effect on the measured values of the Coriolis measuring device.

In an alternative embodiment of the present invention, the valve opening depending on pressure can, for example, be a mechanically adjustable differential pressure regulator. A differential pressure regulator also gradually opens the free flow cross-section at a defined applied differential pressure depending on the selected setting, so that pressure surges are here also avoided, and accurate measurement results can also be achieved. Such a pressure regulator comprises a very small hysteresis and, in contrast to the check valve, is adjustable with regard to its switchover point.

In an embodiment of the invention present, a pressure sensor can, for example, be arranged in the bypass line or in the main line, the pressure sensor being directly connected to the pressure regulator or via the computing unit, the pressure regulator being adjustable depending on the measured values of the pressure sensor. The valve can be opened when reaching a defined pressure which is detected by the pressure sensor depending on customer requirements regarding the output pressure.

The valve can, for example, be a pressure regulator that is adjusted via an electro-pneumatic transducer depending on the pressure measured by the pressure sensor. Such an electro-pneumatic transducer is a valve in which a certain pressure is generated at the outlet of the valve depending on the current applied to the coil. In other words, it is a pressure regulator with I/P transducer. It can be used to open a pneumatically operated valve so that the flow cross-section is opened depending on the current applied to the electro-pneumatic transducer. The applied current can occur via the connection to the pressure sensor as a direct function of the measured pressure. Since different voltages can be applied to the electro-pneumatic transducer for different measured pressures, it is easy to change the switchover point even during operation so that it can be optimized with respect to the input pressure and the output pressure. The switchover point can accordingly be increased at a high input pressure so that measurements can still be taken with the smaller Coriolis measuring device even at higher flow rates. Conversely, when the input pressure is low, the switchover point can be shifted to a lower pressure, which means that although the accuracy of the smaller Coriolis measuring device cannot be used over such a wide measuring range, the output pressure specified by the customer can still be maintained.

The valve can alternatively comprise an electric motor or an electric magnet as an actuator and can be adjustable depending on the measured value of the pressure sensor. The advantages are substantially the same as when using the electro-pneumatic transducer, however, more heat is generated and the input of the heat into the medium must be avoided. The control of such a valve is complex, but very precise.

Accordingly, with regard to the method of the present invention, it is advantageous if, depending on the input pressure into the measuring system or the output pressure from the measuring system, the switching point of the valve is adjusted, which, as has already been described above, enables the output pressure to be maintained and the measuring range of the smaller Coriolis measuring device to be extended. This is done, as has also already been described, by increasing or decreasing the pressure at which the valve is opened as the input pressure or required output pressure increases. If a certain output pressure is to be maintained, it may be necessary to reduce the switching point, i.e., to open the valve at a lower pressure in order to reduce the pressure drop in the system. This can in principle be done between the measurements or during the measurements, wherein an adjustment during the measurement would shift the pressure level thereby reducing the accuracy of the measurements.

The valve can, for example, be a needle valve in which there is only a small amount of vortex formation and thus no risk of erratic pressure differences during opening.

It is furthermore advantageous if a further valve is arranged in the bypass line downstream the valve opening depending on pressure. This valve is used to perform a leakage check on the valve opening depending on pressure.

Three or more Coriolis measuring devices with different maximum flow rates can of course, for example, be connected in series, wherein all Coriolis measuring devices, with the exception of the Coriolis measuring device with the highest maximum flow rate, can be bypassed via a bypass line in which a valve opening depending on pressure is respectively arranged. Their measured values would then be used one after the other as the flow rate increases, wherein the valves each opening depending on pressure would respectively open at a different pressure difference. As the pressure increases, the measured values of the Coriolis measuring device with the next highest maximum flow rate are respectively used by the computing unit.

The valve opening depending on pressure can, for example, be configured so that it switches within the measuring range of the Coriolis measuring device with the higher maximum flow rate, in which the Coriolis measuring device has its maximum accuracy, and in the range of a maximum flow rate of the Coriolis measuring device with the small maximum flow rate. In this range, the throttle effect of the small sensor is too large so that the permitted pressure difference or the maximum flow velocity is exceeded or a sufficient output pressure can no longer be maintained in the system, which is why an additional cross-section must be released to measure the values actually applied to the specimen. This configuration allows correspondingly occurring pressure surges to be prevented and the largest possible measuring range of the smaller Coriolis measuring device to be used, which also increases the maximum measuring accuracy.

A measuring system and a measuring method are accordingly provided with which flow rates occurring across a wide flow range can be measured very accurately, also for gases in the lower measuring range. Such a measuring system is easily adjustable to customer wishes with regard to the output pressure and achieves significantly higher accuracy than known measuring devices.

Three exemplary embodiment of measuring systems according to the present invention are illustrated in the drawings and, like the method according to the present invention, are described below with reference thereto.

Figure 1:
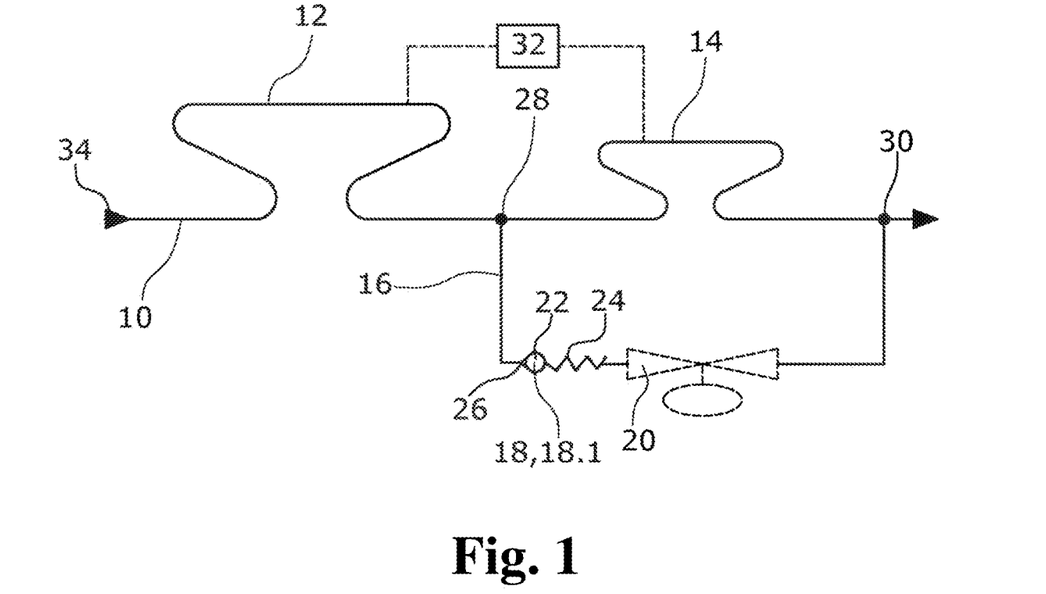
FIG. 1 shows a schematic illustration of a first exemplary embodiment of a measuring system according to the present invention.

The measuring system illustrated in FIG. 1 consists of a first main line 10 which is flown through by a gaseous or liquid medium, e.g., a gaseous fuel, the mass flow rate of which is to be determined.

In main line 10, a first Coriolis measuring device 12 is arranged which has a maximum flow rate that is above the expected maximum flow rate in the measuring system. Such a first Coriolis measuring device 12 does not provide accurate measured values at low flow rates due to a zero point drift which occurs because a certain minimum flow rate is required for an exact measurement in Coriolis measuring devices.

Downstream of the first Coriolis measuring device 12, a second Coriolis measuring device 14 is arranged in main line 10, the maximum flow rate of which is smaller than the maximum flow rate of the first Coriolis measuring device 12, but which provides more exact measured values at low flow rates than the first Coriolis measuring device 12 due to is measuring range.

However, since the downstream second Coriolis measuring device 14 would be above its maximum flow rate in the upper range to be measured and would thus cause an extremely high pressure loss due to the resulting diaphragm effect which would falsify the flow rate to be measured on the specimen or would make it impossible due to an insufficient minimum output pressure, a bypass line 16 branches off from main line 10 between the first Coriolis measuring device 12 and the second Coriolis measuring device 14. The bypass line 16 opens out again into main line 10 downstream of the second Coriolis measuring device 14 in the present exemplary embodiment.

In bypass line 16, a valve 18 which switches depending on pressure is arranged which is designed as a check valve 18.1 in the exemplary embodiment according to FIG. 1.

An additional valve 20 can optionally be arranged in bypass line 16 downstream of check valve 18.1, however the additional valve 20 only serves to check the tightness of check valve 18.1.

In the present exemplary embodiment, check valve 18.1 consists of a ball body 22 being loaded against a valve seat 26 via a spring 24. Depending on the spring rate of spring 24 and the pressure gradients applied to ball body 22, check valve 18.1 opens or closes a flow cross-section of bypass line 16. If a pressure difference is applied to ball body 22 which exceeds the spring rate, the flow cross-section is accordingly released and the medium can flow from a branch 28 of bypass line 16 out of main channel 10 through bypass channel 16 and via a mouth 30 of bypass line 16 back into main line 10.

The check valve 18.1 is dimensioned so that the closure body does not oscillate, even in case of flow rate jumps. If the flow velocities at check valve 18.1 are too high, vortices occur behind check valve 18.1 which can cause pressure pulsations that should be eliminated to the greatest extent possible. Check valve 18.1 is therefore over-dimensioned and its nominal size is increased.

The two Coriolis measuring devices 12, 14 are connected to a computing unit 32 to which the measured values of the Coriolis measuring devices 12, 14 are transmitted and in which the measured values are processed in order to generate a usable measurement result.

The way in which the measurement result is generated in computing unit 32 when measuring with the measuring system is explained below with reference to FIG. 2.

If the medium gets into the main line via an inlet 34, first the first Coriolis measuring device 12 is flowed through and a pressure builds up. Likewise, the second Coriolis measuring device 14 is flowed through in which a pressure is also build up. The smaller second Coriolis measuring device 14 already reaches its measuring range at relatively small flow rates by providing exact measured values. These are shown in FIG. 2 in the left graph 36. At this point in time, a sufficient flow rate for exact measured values has not yet taken place for the first Coriolis measuring device 12 with the higher maximum flow rate. In the first measuring range 38, the measured values of the second Coriolis measuring device 14 are accordingly output as output values by computing unit 32.

As the flow rate in the measurement system increases, the accuracy of the first Coriolis measuring device 12 increases and the pressure drop across the second Coriolis measuring device 14 increases. A second measuring range 40 is accordingly selected in which the measured values of the first Coriolis measuring device 12 and the measured values of the second Coriolis measuring device 14 are taken into account and processed by computing unit 32 by weighting and interpolating the measured values, namely, depending on the differential pressure of the second Coriolis measuring device 14. The second Coriolis measuring device 14 can be considered as a piece of pipe with a known internal diameter so that by measuring the mass flow rate and the density using the first Coriolis measuring device 12, the instantaneous differential pressure of the second Coriolis measuring device 14 can be calculated at any time and then a corresponding weighting can be carried out.

The check valve 18.1 closes bypass line 16 in the first and in the second measuring range 38, 40.

Figure 2:
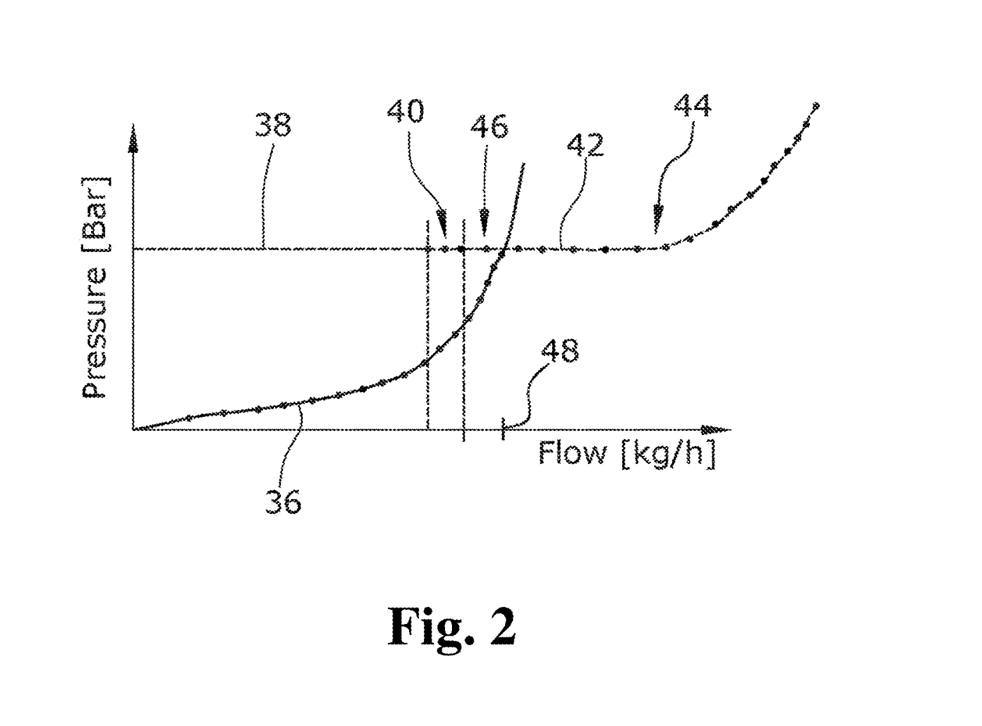
FIG. 2 shows a graph in which the pressure as a function of the flow rate is exemplarily plotted for the method according to the present invention.

In the adjacent range, where the flow rate is high enough to output precise measured values by the first Coriolis measuring device 12, these measured values, shown in the right graph 42 in FIG. 2, are also used as output values by the computing unit 32.

This range is divided into two parts, namely, a third measuring range 44, in which valve 18 opening depending on pressure opens due to the applied pressure, and a fourth measuring range 46 between the second measuring range 40 and the third measuring range 44, in which the measured values of the first Coriolis measuring device 12 are used as the output value, but valve 18 opening depending on pressure is still closed.

This means that a switchover point 48 of the valve 18 opening depending on pressure is spaced apart from the range in which the measured values of the smaller second Coriolis measuring device 14 are used, so that a falsification of the output values due to a shift in the opening pressure of valve 18 opening depending on pressure can be ruled out. Incorrect output values due to incorrect measurement results of the second Coriolis measuring device 14 due to premature opening, for example, due to an existing hysteresis or an age-related displacement of valve 18 opening depending on pressure, are thus reliably excluded.

A knock-on effect of the switching of check valve 18.1 on the output values of the measuring system is largely excluded by the fact that check valve 18.1 opens further as the pressure increases and thus gradually releases an additional flow cross-section, while the resistance at the second Coriolis measuring device 14 increases. A pressure jump is reliably prevented in this way.

Figure 3:
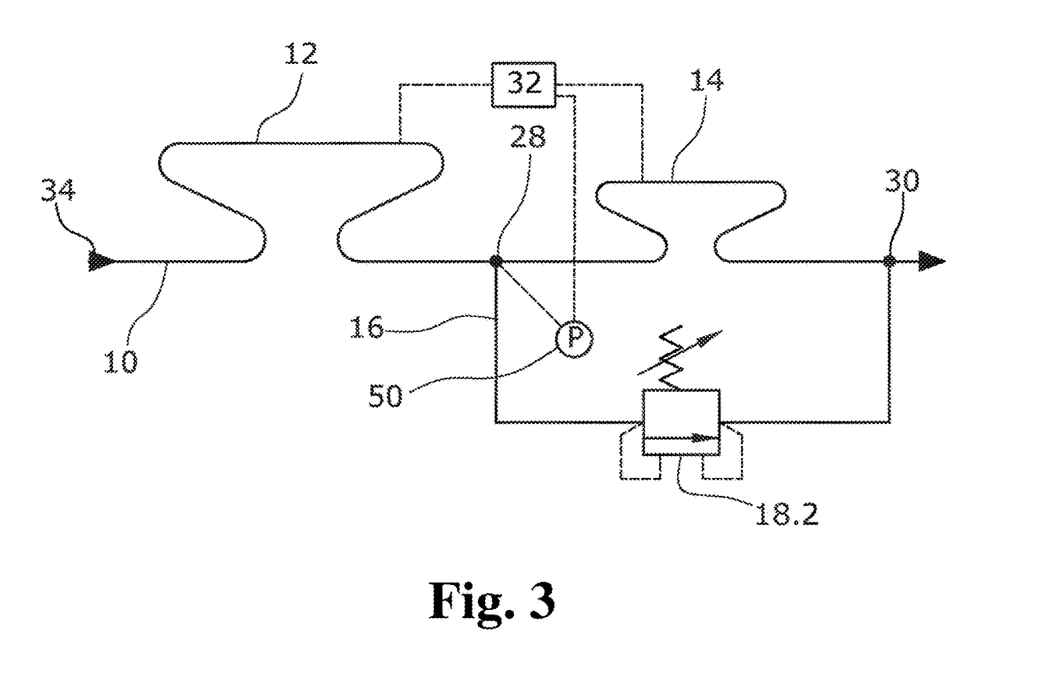
FIG. 3 shows a schematic illustration of a second alternative exemplary embodiment of a measuring system according to the present invention.

FIG. 3 shows an alternative embodiment of the measuring system according to the present invention. This measuring system differs from the measuring system shown in FIG. 1 in that a mechanically adjustable differential pressure regulator 18.2 is used instead of the check valve 18.1. The differential pressure regulator 18.2 has substantially the same characteristics as check valve 18.1, but has the additional advantage that the switchover point 48 is easily and precisely adjustable and that the pressure regulator has a very low hysteresis. A pressure sensor 50 can accordingly be arranged in bypass line 16 or at branch 28 of bypass line 16 from main line 10, which pressure sensor 50 serves to measure the pressure in the corresponding line 10, 16 and to set the opening of the differential pressure regulator 18.2 to a desired switching point. In operation, the function of the differential pressure regulator 18.2 is substantially the same as that of the check valve 18.1, except that there is a significantly reduced hysteresis.

Figure 4:
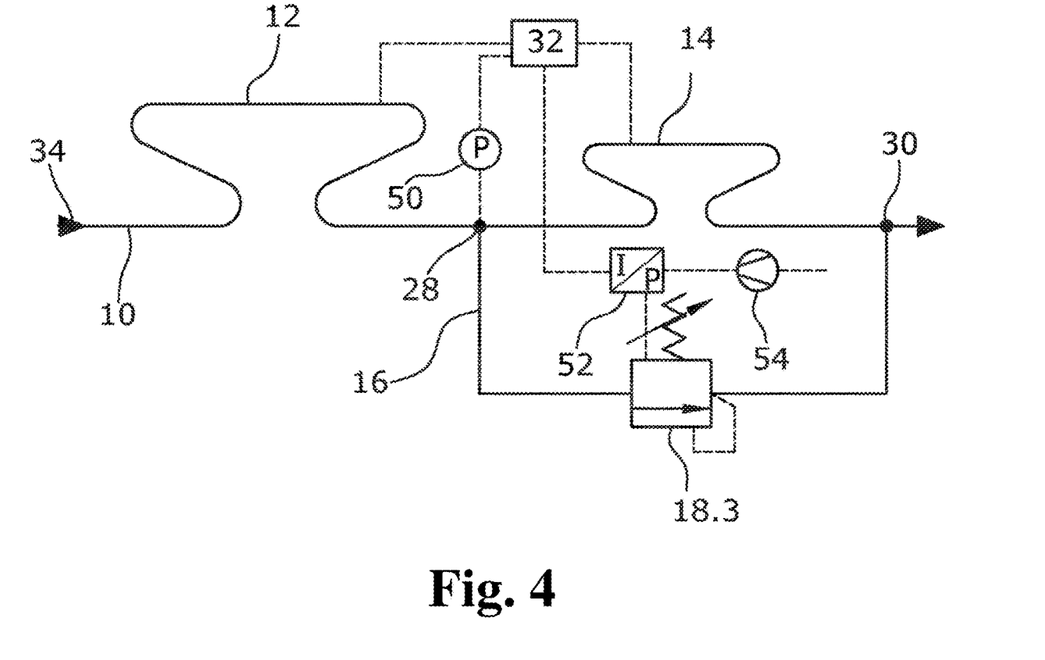
FIG. 4 shows a schematic illustration of a third alternative exemplary embodiment of a measuring system according to the present invention.

A further embodiment is shown in FIG. 4. A pressure regulator 18.3 is here used as valve 18, the pressure regulator 18.3 being actuated by an electro-pneumatic transducer 52 which is supplied via a compressed air source 54 with compressed air for actuating pressure regulator 18.3 and supplies the compressed air to the actuation chamber of pressure regulator 18.3 either completely or in a reduced quantity as a direct function of the applied current intensity. The electro-pneumatic transducer 52 is connected to computing unit 32, as is pressure sensor 50.

Such a construction has the advantage that the switchover point of pressure regulator 18.3 can now be shifted during operation and can thus be optimally adapted to the respective input pressure or output pressure.

The output pressure is usually a value that can be specified by the user of the measuring system. If a very high actual input pressure exists, the switchover point of pressure regulator 18.3 can be shifted to higher pressures, whereby the smaller second Coriolis measuring device 14 can be used over a wider pressure range, since it provides the more exact measured values in its measuring range until a maximum flow rate or a maximum flow velocity is reached, respectively. The first measuring range 38, in which the measured values of the smaller second Coriolis measuring device 14 are used, accordingly becomes wider, while the other measuring ranges 40, 44, 46 are shifted to the right.

Conversely, if a very low input pressure is applied, the switchover point can be shifted to the left and the first measuring range can be reduced. This may be necessary in order to maintain a specified output pressure.

For these shifts of switchover point 48 and measuring ranges 38, 40, 44, 46, corresponding characteristic diagrams can be set in computer unit 32 for different pressures applied and measured via pressure sensor 50 in order to respectively obtain optimized output values by the measuring system.

Figure 5:
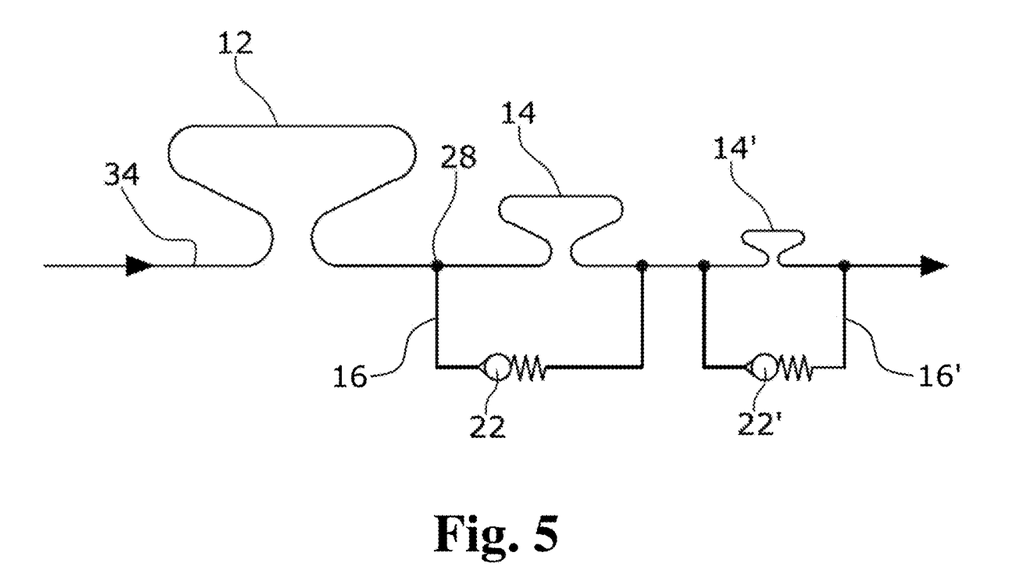
FIG. 5 shows a schematic illustration of a fourth alternative exemplary embodiment of a measuring system according to the present invention.

A further embodiment is shown in FIG. 5 where the second Coriolis measuring device 14 and an additional Coriolis measuring device 14' are each arranged in a bypass line 16, 16'.

The described measuring systems and the described measuring method with such a measuring system provide very accurate measured values over a wide pressure and flow spectrum, which are continuously available. A transient response of the system upon pressure changes is not necessary. This measuring system is in particular also suitable for measuring the flow rates of gases and achieves high measuring accuracies even at very low flow rates.

Various alternatives are of course also conceivable. More than two different Coriolis measuring devices with decreasing maximum flow rates can thus also be connected in series, with respectively one bypass being provided except at the largest Coriolis measuring device. The measured values of the Coriolis measuring device with the smallest maximum flow rate are in this case used in the lowest measuring range. Before the respective valve in the bypass line is opened, the measured values of the respective larger Coriolis measuring device are then used to determine the output value, with respectively one interpolation range being interposed. The opening point of the valves then varies accordingly with the pressure difference arising at the valve due to the pressure loss in the Coriolis measuring device connected in parallel. Instead of the electro-pneumatic transducer with the pressure sensor and the pressure regulator, a valve can also be used than is electromotively or electromagnetically driven and controlled as a function of the values of the pressure sensor, wherein the same advantages can be achieved with said valve. Further modifications also arise for the person skilled in the art within the scope of the main claims.

LIST OF REFERENCE NUMERALS

10 Main line
12 First Coriolis measuring device
14 Second Coriolis measuring device
14' Additional Coriolis measuring device
16, 16' Bypass line
18 Valve
18.1 Check valve
18.2 Differential pressure regulator
18.3 Pressure regulator
20 Additional valve
22, 22' Ball body
24 Spring
26 Valve seat
28 Branch
30 Mouth
32 Computing unit
34 Inlet
36 Left graph
38 First measuring range
40 Second measuring range
42 Right graph
44 Third measuring range
46 Fourth measuring range
48 Switchover point
50 Pressure sensor
52 Electro-pneumatic transducer
54 Air source

The invention claimed is:

1. A measuring system for measuring a mass flow rate, a density, a temperature or a flow velocity, the measuring system comprising:
   a main line;
   a first Coriolis measuring device arranged in the main line;
   a second Coriolis measuring device arranged in series with the first Coriolis measuring device in the main line;
   a bypass line which is configured to bypass the second Coriolis measuring device;
   a first valve arranged in the bypass line, the first valve being configured to automatically open and close depending on a pressure in the bypass line without any external control; and
   a computing unit which is connected to the first Coriolis measuring device and to the second Coriolis measuring device,
   wherein,
   the first Coriolis measuring device is designed for a higher maximum flow rate than the second Coriolis measuring device.

2. The measuring system as recited in claim 1, wherein the first valve is a check valve.

3. The measuring system as recited in claim 2, wherein the check valve comprises a spherical closure body or a conical closure body.

4. The measuring system as recited in claim 1, wherein the first valve is a mechanically adjustable differential pressure regulator.

5. The measuring system as recited in claim 1, further comprising:
   a pressure sensor arranged in the bypass line or in the main line, the pressure sensor being directly connected to the first valve or being connected to the first valve via the computing unit,
   wherein,
   the first valve is further configured to be adjustable depending on a pressure value measured by the pressure sensor.

6. The measuring system as recited in claim 5, further comprising:
   an electro-pneumatic transducer,
   wherein,
   the first valve is a pressure regulator which is configured to be adjustable via the electro-pneumatic transducer depending on the pressure value measured by the pressure sensor.

7. The measuring system as recited in claim 5, wherein,
   the first valve comprises an electric motor or an electric magnet as an actuator, and
   the first valve is further configured to be adjustable depending on the pressure value measured by the pressure sensor.

8. The measuring system as recited in claim 7, wherein the first valve is a needle valve.

9. The measuring system as recited in claim 1, further comprising:
   an additional valve arranged in the bypass line downstream of the first valve.

10. The measuring system as recited in claim 1, wherein the first valve is further configured to be adjustable,
    within a measuring range of the first Coriolis measuring device having the higher maximum flow rate, in which the first Coriolis measuring device has its maximum accuracy, and in a range of a maximum flow rate of the second Coriolis measuring device having a small maximum flow rate.

11. The measuring system as recited in claim 1, further comprising:
   at least one additional Coriolis measuring device having a different maximum flow rate than each of the first Coriolis measuring device and the second Coriolis measuring device; and
   at least one additional bypass line,
   wherein,
   the first Coriolis measuring device, and second Coriolis measuring device, and the at least one additional Coriolis measuring device are connected in series, and
   the at least one additional bypass line is further configured to additionally bypass the at least one additional Coriolis measuring device.

12. A method for measuring a mass flow rate, a density, a temperature or a flow velocity with the measuring system as recited in claim 1, the method comprising:
   in a first measuring range, in which the first valve is closed, using measured values of the second Coriolis measuring device with a lower maximum flow rate as output values of the mass flow rate, the density, the temperature or the flow velocity;
   in a second measuring range, in which the first valve remains closed and a flow rate and a pressure are greater than a flow rate and a pressure in the first measuring range,
      measuring and weighting measured values of the first Coriolis measuring device with the higher maximum flow rate and the measured values of the second Coriolis measuring device with a lower maximum flow rate as a function of a differential pressure of the second Coriolis measuring device so as to obtain weighted measured values of the first Coriolis measuring device and of the second Coriolis measuring device, and
      calculating output values for the mass flow rate, the density, the temperature or the flow velocity in the computing unit from the weighted measured values of the first Coriolis measuring device and of the second Coriolis measuring device; and
   in a third measuring range, in which the first valve is open and a pressure in the bypass line is higher than the pressure in the second measuring range, using the measured values of the first Coriolis measuring device with the higher maximum flow rate as output values for the mass flow rate, the density, the temperature or the flow velocity.

13. The method as recited in claim 12, further comprising:
   in a fourth measuring range between the second measuring range and the third measuring range, in which the first valve remains closed, using the measured values of the first Coriolis measuring device with the higher maximum flow rate as output values.

14. The method as recited in claim 12, further comprising:
   adjusting an opening pressure at which the first valve is opened depending on an input pressure into the measuring system or an output pressure from the measuring system.

15. The method as recited in claim 14, further comprising:
   increasing or decreasing the opening pressure at which the first valve is opened as the input pressure or the output pressure increases.

\* \* \* \* \*